United States Patent [19]

Symmons

[11] 4,324,980

[45] Apr. 13, 1982

[54] ELECTRON EXIT WINDOW ASSEMBLY FOR A LINEAR ACCELERATOR

[75] Inventor: Edgar B. Symmons, Walnut Creek, Calif.

[73] Assignee: Siemens Medical Laboratories, Inc., Walnut Creek, Calif.

[21] Appl. No.: 170,607

[22] Filed: Jul. 21, 1980

[51] Int. Cl.[3] .................... G02B 5/00; H01J 7/26

[52] U.S. Cl. .................... 250/505; 250/419; 250/510; 313/35

[58] Field of Search .................... 250/419, 505, 510; 313/35, 59, 330

[56] References Cited

U.S. PATENT DOCUMENTS 2,722,620 11/1955 Gale .................... 250/505

3,105,916 10/1963 Marker et al. .................... 313/35

3,222,558 12/1965 Hueschen .................... 313/59

4,121,109 10/1978 Taumann .................... 250/505

*Primary Examiner*—Harold A. Dixon

*Attorney, Agent, or Firm*—Spellman, Joel and Pelton

[57] ABSTRACT

The electron exit window assembly contains a metal cover plate, a titanium insert piece and a titanium exit window. The cover plate covers the interior of the last cavity of the accelerator. It contains an insert opening into which is inserted the insert piece in a vacuum tight manner. The insert piece in turn contains a hole which is covered by the exit window. The cover plate preferably is made of stainless steel, and the insert piece is preferably brazed into the insert opening of the cover plate.

14 Claims, 10 Drawing Figures

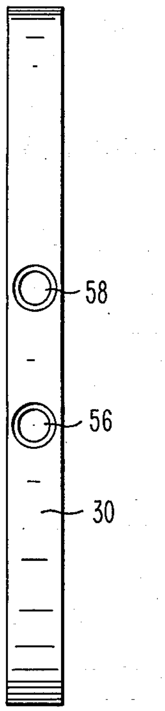
FIG. 9
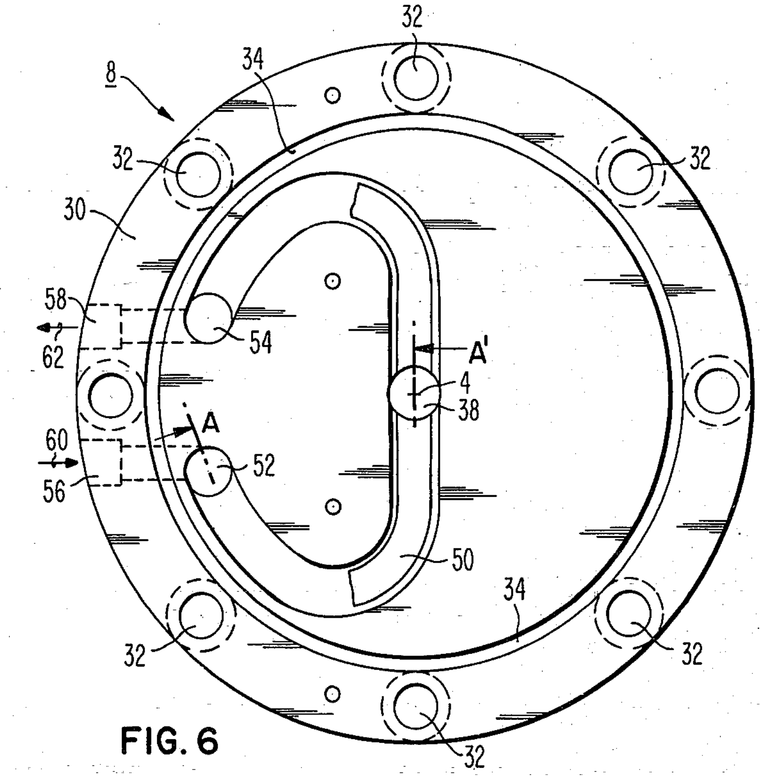
FIG. 6
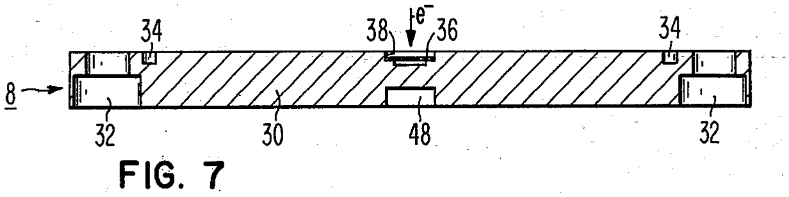
FIG. 7
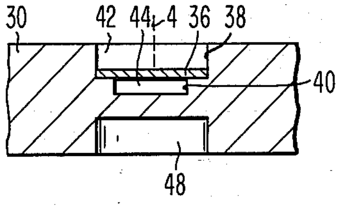
FIG. 8
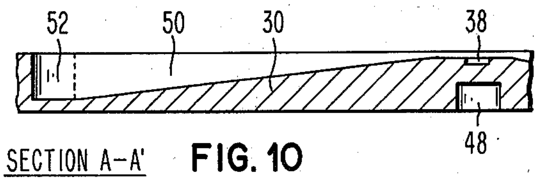
SECTION A-A' FIG. 10

ELECTRON EXIT WINDOW ASSEMBLY FOR A LINEAR ACCELERATOR

BACKGROUND OF THE INVENTION

1. Field of the Invention

This invention relates to an electron exit window assembly for a linear accelerator. In particular, this invention relates to a new material combination for the components used in such an assembly.

2. Prior Art

The U.S. Pat. No. 4,121,109 discloses an electron accelerator which is intended for use in medical radiotherapy. In this electron accelerator the accelerator tube is sealed by a vacuumtight beam exit window of special steel, transparent for electrons. In the beam direction beyond the beam exit window of the accelerator tube is a target which is made of a material of high atomic number, such as platinum, tantalum, gold or tungsten. And in the beam direction beyond the target is an electron absorber, in which any remaining electrons are filtered out of the X-ray cone. Finally, in the beam direction beyond the electron absorber is a collimator for masking out the active X-ray or beam cone, and a compensation body or filter through which the radiated intensity is equalized over the width of the beam cone.

In such an electron accelerator the electron beam exit window absorbs a certain part of the electron beam power to be supplied to the target and also limits the maximum electron beam power for thermal reasons. The electron absorption or capture rate should be kept low in order to improve the performance of the accelerator. Also the efficiency of the target should be increased in order to improve the generation of X-rays.

SUMMARY OF THE INVENTION

Objects

It is an object of this invention to provide an electron exit window assembly for a linear accelerator having a long lasting exit window which separates the evacuated interior of the accelerator from its exterior.

It is another object of this invention to provide an electron exit window assembly for a linear accelerator, the exit window of which has a low electron capture rate and a high melting point.

It is anothe object of this invention to provide an electron exit window assembly, the exit window of which is made of a thin foil of a metal, the density of which is lower than that of formerly used materials, in order to achieve a high electron penetration rate.

it is still another object of this invention to provide an electron exit window assembly, the exit window of which is made of titanium.

It is still another object of this invention to provide an electron exit window assembly in which a titanium exit window is attached or connected to a cover plate in the form of a ring made of stainless steel in a vacuum-tight manner.

It is still another object of this invention to provide an electron exit window assembly to which can readily be attached a target assembly.

Summary

According to this invention, the electron window assembly for a linear accelerator contains a cover plate for sealing the interior of the linear accelerator in a vacuum-tight manner, the cover plate having an opening therethrough; an insert piece of titanium inserted into this opening in a vacuum tight-manner, the insert piece having also an opening therethrough; and an electron exit window made of a thin titanium foil and connected across the opening in the insert piece in a vacuum tight-manner.

Preferably, the cover plate may be made out of stainless steel. It may be welded to a connecting ring that is brazed to the last accelerating cavity of the accelerator. The titanium insert piece may preferably be brazed into the first opening, and the titanium exit window preferably may be welded to the insert piece.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 6 is a top view of the target assembly shown in FIG. 1;

FIG. 7 is a cross-section of the target assembly of FIG. 6;

FIG. 8 is an enlarged section of the cross-section of FIG. 7;

FIG. 9 is a side view of the target assembly of FIG. 6; and

FIG. 10 is a section along line A—A' in FIG. 6.

DETAILED DESCRIPTION OF THE PREFERRED EMBODIMENTS

Figure 1:
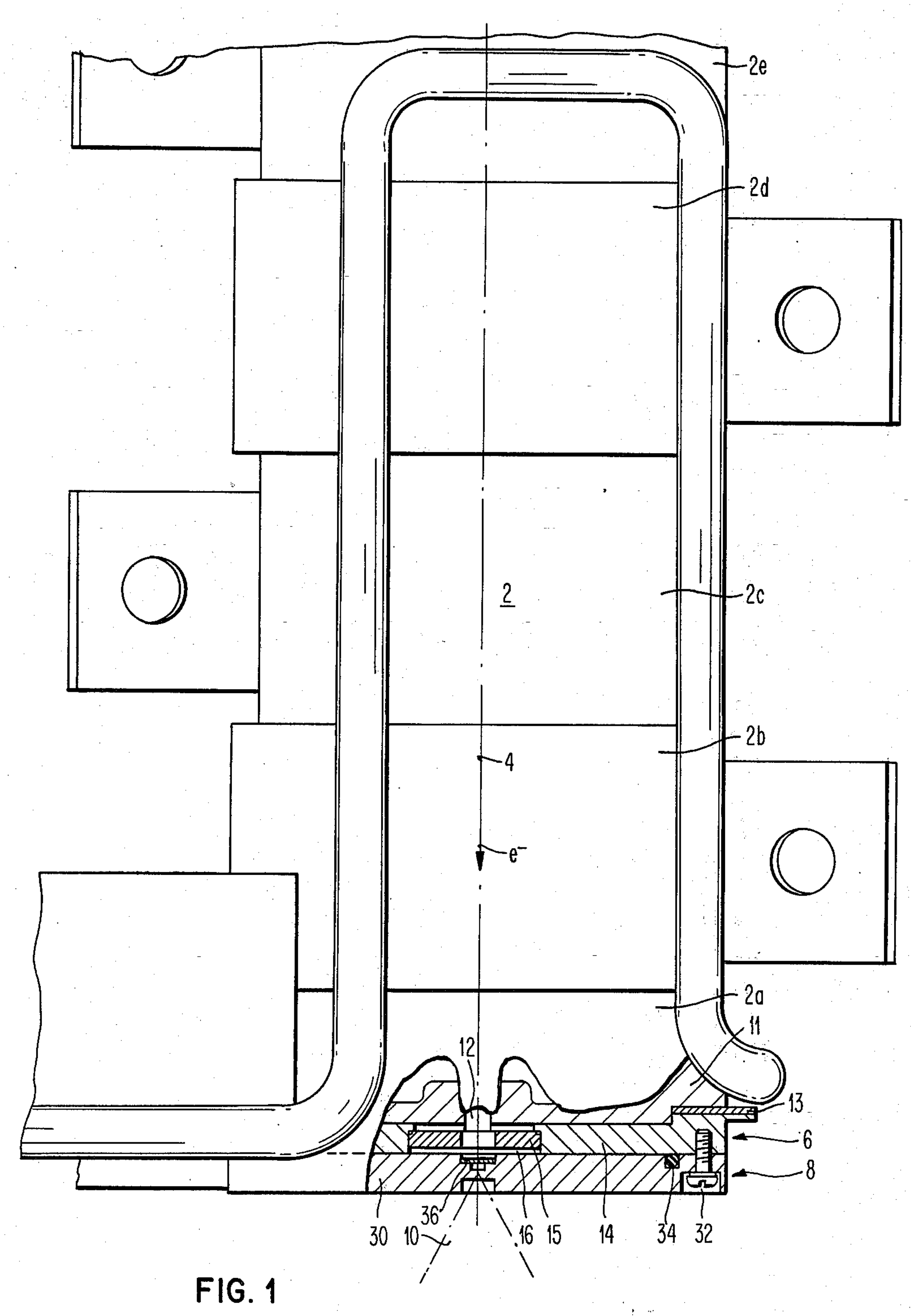
FIG. 1 is a view of a linear accelerator waveguide, showing its electron exit window assembly and its target assembly, partially in a cross-section.

FIG. 1 shows the waveguide 2 of a linear accelerator in which electrons e− are accelerated along an axis 4. The waveguide 2 contains several evacuated cavities *2a, 2b, 2c, 2d, 2e*, the last one (in the acceleration direction) of which is designated as cavity *2a*. Having passed the last cavity *2a*, the accelerated electrons e− will leave the waveguide 2 through an electron exit window assembly 6 and enter a target assembly 8 in order to generate X-rays 10. In the embodiment illustrated, both assemblies 6 and 8 are of high performance.

As can be seen in FIG. 1, the last cavity *2a* is partially formed and covered by an end plate 11 having a central opening 12 for transmitting the accelerated electrons e− therethrough. The end plate 11 may preferably consist of copper.

To the lower end face of the end plate 11 is secured a thin connecting ring 13. The ring 13 may consist of stainless steel and preferably may be brazed to the cover plate 11. In the embodiment shown in FIG. 1, the connecting ring 13 is positioned in an annular groove of the end plate 11, thus forming an annular recess for positioning the window assembly 6.

Figure 2:
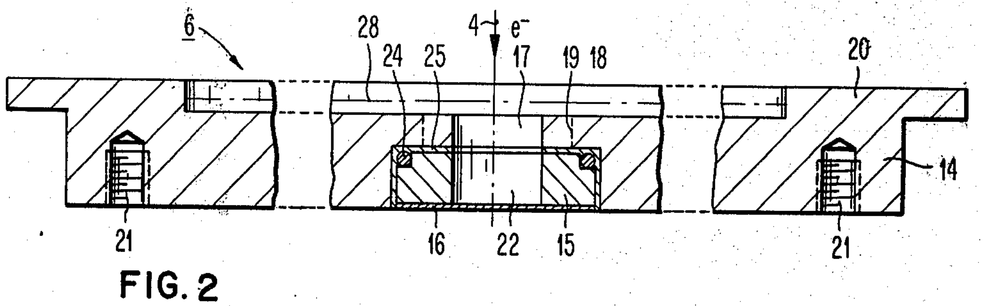
FIG. 2 is a cross-section of the electron exit window assembly of FIG. 1 in an enlarged scale.

According to FIGS. 1 and 2, the electron exit window assembly 6 contains as its main parts a cover plate 14, an insert piece 15 and an electron exit window 16.

The selection of the materials for these main parts is of importance. The cover plate or window body 14 consists of stainless steel, the insert piece 15 consists of titanium, and the electron exit window 16 consists of a thin titanium foil.

The electron exit window assembly 6 is designed to seal the evacuated interior of the linear accelerator in a vacuum-tight manner and to let a large number of accelerated electrons e− pass through the exit window 16.

As can be seen in FIG. 2, the cover plate 14 has a cylindrical configuration. It contains a central opening, that is a bore 17, for passing the accelerated electrons e− therethrough. The base 17 widens in the motion direction of the accelerated electrons e− so that a step 18 is formed. The upper part of the base 17 may have a diameter which is different from the diameter of the opening 12 in the end plate 11. In other words, the cover plate 14 could be cut off along the hatched lines 19. Yet, there should be sufficient contact area between the step 18 and the upper end face of the titanium insert piece 15 to allow for a connection by brazing.

Figure 3:
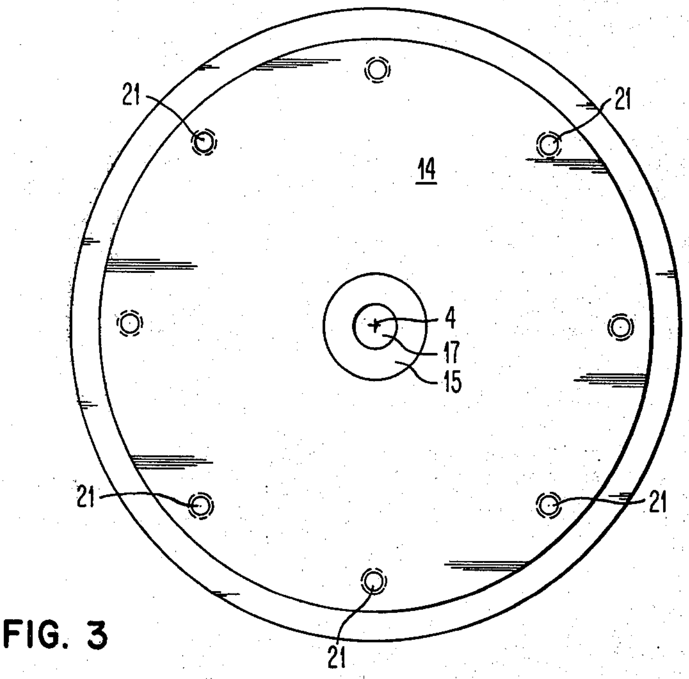
FIG. 3 is a bottom view of the electron exit window assembly of FIG. 2 in a decreased scale, whereby the exit window is removed.

The cover plate 14 is provided with an elevated rim portion 20 on the upper end face. It is also provided with thread holes 21 distributed on its lower end face for connecting the target assembly 8 thereto. The distribution of the thread holes 21 along a circle concentric to the cover plate 14 can be seen in FIG. 3.

Figure 4:
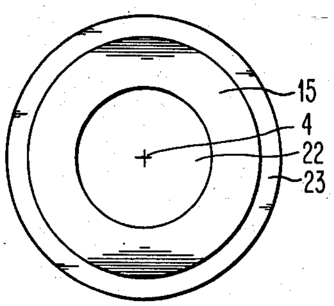
FIG. 4 is a top view of an insert piece used in the exit window assembly of FIG. 2.
Figure 5:
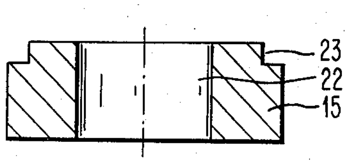
FIG. 5 is a cross-section of the insert piece used in the exit window assembly of FIG. 2.

The titanium insert piece 15 is illustrated in FIGS. 4 and 5. The insert piece 15 is of cylindrical shape. It contains a concentrically located opening, particularly a bore 22. The insert piece 15 has an annular groove 23 machined into its upper end face.

The dimensions of the insert piece 15 are such that (when inserted into the lower end of the bore 17) there is some tolerance between the upper end face of the insert piece 15 and the ring-shaped area of the step 18 as well as between the cylindric outer wall of the insert piece 15 and the cylindric wall of the lower part of the bore 17. These contact areas belong to parts 14 and 15 which are made of stainless steel. Before the brazing process can start, these contact areas should first be plated with nickel and then with silver. It is important that at least one pair of contact areas, that is either the planar or the cylindrical area, is plated in this way. Thus a vacuum-tight braze joint will be obtained. For the process of brazing, the cover plate 14 is turned upside down, that is the upper end face of the cover plate 14 (see FIG. 2) will then be directed downward.

The dimensions of the insert piece 15 are such that after the brazing process, the lower end face of the exit window 16 is arranged in the same plane as the lower end face of the cover plate 14.

The titanium exit window 16 consists of a thin circular foil. This foil, which may have a thickness of about 0.002 inches, is welded to the titanium insert piece 15. The welded seam on the circumference of the foil is not specifically marked in FIG. 2.

After the welding process, a wire 24 of braze material will be introduced into the groove 23. Into the broader part of the bore will be inserted a ring-shaped foil 25 of braze material such as to cover the area of the step 18. The braze material may preferably be an alloy made of Ag, Pd and Ga. The contents may be, for instance, 82% Ag, 9% Pd and 9% Ga. Such a braze material is marketed under the trade name GAPASIL by Western Gold and Platinum Co., Belmont, Calif.

After welding, the combination of exit window 16 and insert piece 15 will also be inserted into the opening 17. During the following brazing process the space between the upper end face of the insert piece 15 and the area of the setp 18 as well as the space between the cylindrical walls of the insert piece 15 and the bore 17 are filled with braze material and firmly connected to each other.

The last step in the production of the window assembly 6 is to weld the outer rim portion 20 to the connecting ring 13.

There may be some free space or a gap between the adjacent end faces of the plates 11 and 14. This can easily be evacuated and avoids virtual leaks. The gap is shown in FIG. 2. It is located between the lower end face of the end plate 11 represented by a dotted line 28 and the major upper end face of the cover plate 14.

The application of a titanium electron exit window 16 results in some great advantages. Since titanium is less dense than most of the metals previously used, it has a lower electron capture rate. Titanium also has a higher melting point than other metals used as exit windows. Additionally, it has a better strength, so that a foil of small thickness may be applied. Although it is difficult to braze a foil of titanium on stainless steel, it is possible to create a titanium/stainless steel window assembly by using the ring-shaped insert piece 15 of titanium, which has a greater thickness than the exit window 16, and by brazing this insert piece 15 to a larger contact area of the cover plate 14.

With reference to FIGS. 6–9, the target assembly 8 of the linear accelerator contains a cylindrical base plate 30 which may be made, for instance, of stainless steel. However, the base plate 30 may also be made of another metal. On the rim of the base plate 30 are distributed eight holes 32, which match the holes 21 shown in FIG. 3. These holes 32 are determined to receive screws for attaching the base plate 30 to the exit window assembly 6.

The upper surface of the base plate 30 contains an anjular groove 34 for receiving an O-ring (not shown). The O-ring provides a water tight seal with respect to the exit window assembly 6. An electron target 36 is supported by the base plate 30 in a manner described in detail below. Water may be used as a cooling medium for cooling the base plate 30 and, more importantly, the electron target 36. The target 36 serves to generate X-rays when hit by the high energy electrons e−. The target 36 may be made, for instance, out of a heavy metal such as gold or platinum. The target 36 has the shape of a cylindrical disk.

By removing the screws from the holes 32, the base plate 30 can easily be removed and the target 36 can easily be exchanged if so desired. Re-attaching of the base plate 30 leads to an automatic adjustment of the target 36 with regard to the beam of high energy electrons e−.

According to FIGS. 7 and 8, the target 36 is securely retained in a first cylindrical recess 38 which is centrally located in the upper end face of the base plate 30. This upper end face faces the high energy electrons e− coming from the exit window assembly 6. The recess 38 contains a step 40, thus forming a contact area for the target 36. The target 36 inserted into the recess 38 divides the recess 38 into a larger upper chamber 42 and a smaller lower chamber 44, as can be seen in FIG. 8. The upper chamber 42 is covered when the base plate 30 is secured to the electron exit window assembly 6. The upper chamber 42 is part of a first cooling channel, and the lower chamber 44 is part of a second cooling channel. These cooling channels are arranged parallel to each other. A cooling medium such as water flows through both channels. Thus, both sides of the target 36 are directly exposed to the cooling medium.

In the lower end face of the base plate 30 there is centrally located a second cylindrical recess 48. This second recess 48 may have a diameter that equals the diameter of the upper broader part of the first recess 42. It will be noted from FIGS. 7 and 8 that it has not found to be necessary to provide an absorber (such as an absorber made of lead) in the second recess 42.

The wall between the second chamber 44 and the second recess 48 is chosen to be thin so that the X-rays generated in the target 36 are attenuated only to a small degree.

In FIG. 10 is shown a section along line A—A' in FIG. 6. FIGS. 6 and 10 illustrate that the target 36 is intensively cooled. The cooling channels passing through the chambers 42, 44 are branches or parallel side channels of a main cooling channel 50. The main cooling channel 50 is formed by a C-shaped groove which is milled into the left half of the upper end face of the base plate 30. The groove has a constant width. It is covered by a cover plate which is formed by the lower end face of the exit window assembly 6. In particular, the recess 38 is covered by the exit window 16.

The ends of the C-shaped channel 50 are designated as 52 and 54. These ends 52 and 54 merge into end pieces 56 and 58, respectively, which are arranged parallel to each other and parallel to the end faces of the base plate 30. The flow of a coolant is indicated by arrows 60 and 62. From section A—A' in FIG. 10 can be seen that the channel 50 becomes shallow as the coolant flows from the end piece 56 via the channel end 52 to the chambers 42, 44, and that subsequently the channel 50 becomes deeper and deeper as the coolant leaves the chambers 42, 44 and flows toward the channel end 54 and from there to the end piece 58. The maximum speed of the cooling medium will thus be reached when the medium passes the target 36 separating the chambers 42, 44. Therefore, a high amount of heat is dissipated from the target 36 to the coolant. The coolant on its way through the channel 50 is also in good thermal exchange contact with the base plate 30. This results in an effective cooling.

There has thus been shown and described a novel assembly for an electron accelerator which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. An electron exit window assembly for a linear accelerator, comprising in combination:

(a) a cover plate for sealing the interior of said linear accelerator in a vacuum-tight manner, said cover plate having a first opening therethrough for passing a beam of electrons;

(b) an insert piece of titanium inserted into said first opening in a vacuum-tight manner, said insert piece having a second opening therethrough; and (c) an electron exit window made of a thin titanium foil and connected across said second opening in a vacuum-tight manner.

2. The electron exit window assembly according to claim 1, wherein said cover plate has a cylindrical configuration, wherein said first opening is a first bore having a step and is centrally disposed in said cover plate, and wherein said second opening is a second bore that is centrally disposed in said insert piece.

3. The electron exit window assembly according to claim 1, wherein said exit window has a thickness of about 0.002 inches.

4. The electron exit window assembly according to claim 1, wherein said cover plate comprises stainless steel.

5. The electron exit window assembly according to claim 4, wherein said titanium foil is welded to said titanium insert piece, and wherein said insert piece is brazed into said first opening.

6. The electron exit window assembly according to claim 5, wherein the braze material for brazing said insert piece into said first opening is an alloy made of silver, palladium and gallium.

7. The electron exit window assembly according to claim 6, wherein said alloy contains approximately 82% silver, 9% palladium and 9% gallium.

8. The electron exit window assembly according to claim 1, wherein said insert piece is a cylindrical ring having an annular groove on one of its two end faces for receiving a braze material.

9. The electron exit window assembly according to claim 1, wherein a series of cavities is provided for the acceleration of electrons, wherein the last one of said cavities is covered by an end plate, and wherein said cover plate has an elevated rim for connection to said end plate of the last cavity.

10. The electron exit window assembly according to claim 9, wherein a connecting ring is provided on said end plate of said last cavity, and wherein said elevated rim of said cover plate is welded to said connecting ring.

11. The electron exit window assembly according to claim 9, wherein some free spaces is provided between the adjoining end faces of said end plate and said cover plate.

12. The electron exit window assembly according to claim 1, wherein said titanium foil is arranged essentially in the same plane as one of the end faces of said cover plate.

13. The electron exit window assembly according to claim 12, wherein said titanium foil is arranged in the same plane as that one of the two end faces of said cover plate which faces away from the arriving accelerated electrons.

14. The electron exit window assembly according to claim 1, wherein means are provided for connecting a target assembly to said cover plate.

* * * * *